(12) United States Patent
Tanaka et al.

(10) Patent No.: US 11,216,533 B2
(45) Date of Patent: Jan. 4, 2022

(54) INVERSE-IMAGE SAMPLING DEVICE, INVERSE-IMAGE SAMPLING METHOD, AND INVERSE-IMAGE SAMPLING PROGRAM

(71) Applicant: NEC CORPORATION, Tokyo (JP)

(72) Inventors: Yuki Tanaka, Tokyo (JP); Kazuhiko Minematsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 135 days.

(21) Appl. No.: 16/611,262

(22) PCT Filed: May 12, 2017

(86) PCT No.: PCT/JP2017/018030
§ 371 (c)(1),
(2) Date: Nov. 6, 2019

(87) PCT Pub. No.: WO2018/207348
PCT Pub. Date: Nov. 15, 2018

(65) Prior Publication Data
US 2020/0167406 A1 May 28, 2020

(51) Int. Cl.
*G06F 17/16* (2006.01)
*G06F 7/58* (2006.01)
*H04L 9/08* (2006.01)
*H04L 9/30* (2006.01)

(52) U.S. Cl.
CPC .............. *G06F 17/16* (2013.01); *G06F 7/582* (2013.01); *H04L 9/0869* (2013.01); *H04L 9/3093* (2013.01); *H04L 2209/08* (2013.01)

(58) Field of Classification Search
CPC ....... G06F 17/16; G06F 7/582; H04L 9/3093; H04L 2209/08; H04L 9/0869

USPC ......................................................... 708/520
See application file for complete search history.

(56) References Cited

FOREIGN PATENT DOCUMENTS

JP 5059928 B2 10/2012

OTHER PUBLICATIONS

Daniele Micciancio et al., "Trapdoors for Lattices: Simpler, Tighter, Faster, Smaller", EUROCRYPTO 2012, pp. 700-718.
Craig Gentry et al., "How to Use a Short Basis: Trapdoors for Hard Lattices and New Cryptographic Constructions", National Science Foundation, 2008, pp. 1-41.

(Continued)

*Primary Examiner* — Tan V Mai
(74) *Attorney, Agent, or Firm* — Sughrue Mion, PLLC

(57) ABSTRACT

A grouping means 11 that extracts basis vectors from a set of basis vectors for a lattice having a predetermined relationship with a matrix used to generate a public key, and that groups the basis vectors such that a predetermined condition is satisfied. A sampling means 12 that samples, for at least one group, the same number of arbitrary values as the number of a plurality of basis vectors included in that group, in parallel for the individual basis vectors, onto a lattice constituted by the plurality of basis vectors, the arbitrary values serving as random numbers following a discrete Gaussian distribution. The predetermined condition is that each of the basis vectors included in a group is orthogonal to the other basis vectors included in the same group and is also orthogonal to Gram-Schmidt basis vectors, which are vectors obtained by orthogonalizing the other basis vectors by Gram-Schmidt orthogonalization.

20 Claims, 6 Drawing Sheets

(56) References Cited

OTHER PUBLICATIONS

Yuki Tanaka et al., "Efficient Discrete Gaussian Sampling on Constrained Devices", IEICE Technical Report, Jul. 7, 2016, pp. 169 to 175, vol. 116, No. 129.
Atsushi Takayasu et al., "Tight Reduction for Lattice Cryptography by Optimizing the Order of Renyi Divergence", SCIS 2016 [USB], Jan. 19, 2016, 1D1-2, pp. 1-8.
Craig Gentry, et al., "Trapdoors for Hard Lattices and New Cryptographic Constructions", Proceedings of the fortieth annual ACM symposium on Theory of computing (STOC '08), May 17, 2008, pp. 197-206.
International Search Report for PCT/JP2017/018030, dated Jul. 25, 2017.

FIG. 1

1 : take $\vec{b}_1, \cdots, \vec{b}_n$, and $\sigma, \vec{c}$

2 : $\vec{\tilde{b}}_1, \cdots, \vec{\tilde{b}}_n \leftarrow$ Gram–Schmidt matrix of $\vec{b}_1, \cdots, \vec{b}_n$ 3 : $\vec{c}_n \leftarrow \vec{c}, \vec{v}_n \leftarrow 0$ 4 : for $i = n$ to 1 do

5 :     $c'_i \leftarrow \langle \vec{c}_i, \vec{\tilde{b}}_i \rangle / \|\vec{\tilde{b}}_i\|^2$ 6 :     $\sigma_i \leftarrow \sigma / \|\vec{\tilde{b}}_i\|$ 7 :     $z_i \leftarrow D_{\mathbb{Z}, c'_i, \sigma_i}$ 8 :     $\vec{c}_{i-1} \leftarrow \vec{c}_i - z_i \vec{b}_i$ 9 :     $\vec{v}_{i-1} \leftarrow \vec{v}_i + z_i \vec{b}_i$ 10 : end for

11 : Return $\vec{v}_0$

FIG. 2

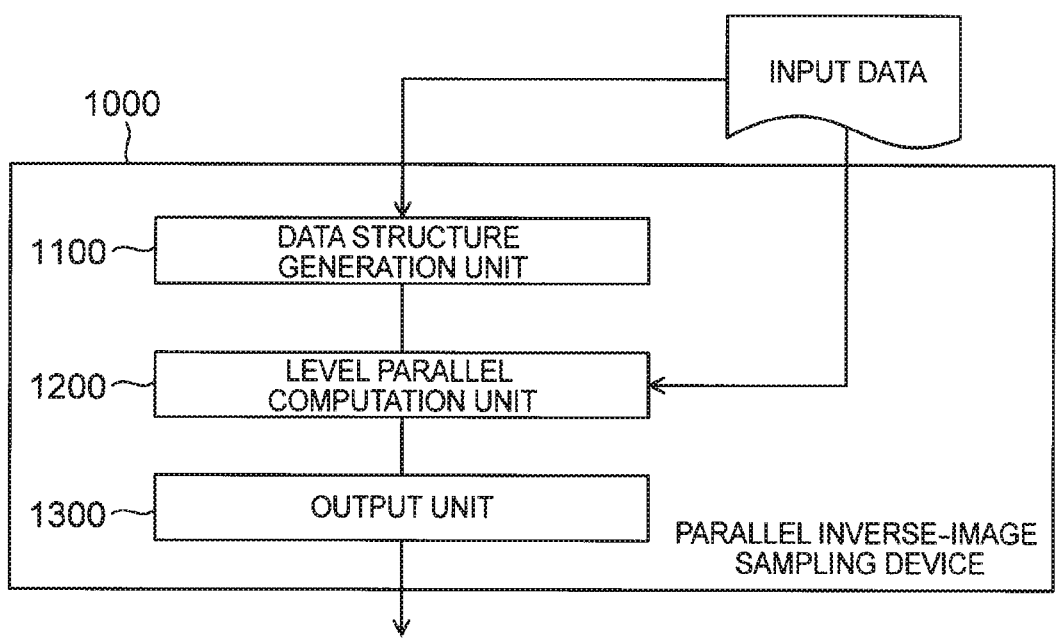

FIG. 8

1 : for $i = 0$ to $k-1$ do

2 :   $x_i \leftarrow D_{2z+u, \sigma}$

3 :   $u \leftarrow (u - x_i)/2$

4 : end for

5 : Return $(x_0, \cdots, x_{k-1})$

INVERSE-IMAGE SAMPLING DEVICE, INVERSE-IMAGE SAMPLING METHOD, AND INVERSE-IMAGE SAMPLING PROGRAM

CROSS REFERENCE TO RELATED APPLICATIONS

This application is a National Stage of International Application No. PCT/JP2017/018030 filed May 12, 2017.

TECHNICAL FIELD

The present invention relates to an inverse-image sampling device, an inverse-image sampling method, and an inverse-image sampling program used in a trapdoor one-way function construction method, and particularly to an inverse-image sampling device, an inverse-image sampling method, and an inverse-image sampling program that generate random numbers used for lattice cipher and signature in parallel.

BACKGROUND ART

The trapdoor one-way function (hereinafter, also referred to as "trapdoor function") is a function generated in a procedure including a key generation process, a function computation process, and an inverse-image sampling process. The trapdoor function is used particularly in a public key cryptographic scheme or an electronic signature scheme.

A cipher or signature using a lattice is a cipher system having an efficiency based on simplicity of computation or homomorphism based on linearity of a basic operation. Furthermore, as a cipher for which an attack method using a quantum computer has not been found yet, cipher or signature using a lattice is currently under research and development.

A typical construction method of a trapdoor function in cipher and signature using a lattice is described in Non Patent Literature (NPL) 1. Hereinafter, the construction method described in NPL 1 will be described.

In the construction method described in NPL 1, a computing operation is performed by $Z_q = Z/qZ$ (in other words, mod q). Character q is an integer of a power of 2 represented by $2^K$ (K is a natural number). In addition, Z is a symbol representing a set of whole integers.

First, description will be made on a primitive lattice matrix that plays an important role in the construction method described in NPL 1. The primitive lattice matrix is expressed as follows.

[MATH. 1]

$$G = \begin{bmatrix} \vec{g} & \cdots & 0 \\ \vdots & \ddots & \vdots \\ 0 & \cdots & \vec{g} \end{bmatrix} \quad (\vec{g} = (1, 2, \ldots, 2^{K-1})) \quad \text{Equation (1)}$$

Furthermore, for the primitive lattice matrix G expressed by the equation (1), a basis matrix S of a dual primitive lattice is, for example, a matrix expressed as described below.

[MATH. 2]

$$S = \begin{bmatrix} 2 & 0 & \cdots & & 0 \\ -1 & 2 & 0 & \cdots & 0 \\ 0 & -1 & 2 & & 0 \\ & & & \ddots & \vdots \\ & & & -1 & 2 \end{bmatrix} \quad \text{Equation (2)}$$

An equation GS=0 is satisfied in a relation between G and S defined as described above.

A set defined by $\{\sum_{i=1}^{n} Z\vec{a_i}\}$ for vectors $\vec{a_1}$ to $\vec{a_n}$ is referred to as "lattice." Character i indicates one of integers 1 to n representing the order of the vectors. In the lattice, a sum of vectors $Z\vec{a_i}$ is computed over 1 to n.

Although the symbols "-," "→," "~," and the like used in the text of this description should be each originally placed right above the previous character, they are placed right after the character as described above due to restrictions of a text notation. In each equation, these symbols are placed in the original positions.

Moreover, vectors $\vec{a_1}$ to $\vec{a_n}$ are referred to as "basis vectors for a lattice" or simply referred to as "bases." Generally, a lattice generated on the basis of a matrix $A=(\vec{a_1}, \vec{a_2}, \ldots, \vec{a_n})$ represents a lattice $\{\sum_{i=1}^{n} Z\vec{a_i}\}$. Hereinafter, the lattice $\{\sum_{i=1}^{n} Z\vec{a_i}\}$ is described as $\Lambda(A)$. In addition, A is referred to as "basis matrix."

With the use of the above basis matrix, the key generation process, the function computation process, and the inverse-image sampling process are performed. The following describes the content of the key generation process, the content of the function computation process, and the content of the inverse-image sampling process.

First, the content of the key generation process is described. The key generation process is performed to output a matrix to be a public key and a matrix to be a trapdoor at the time of input of a parameter "param=(K, N, $q=2^K$, $M^-=O(NK)$, $M=M^-+NK$, $\sigma=\omega((\log N)^{1/2}, \alpha))$." Incidentally, the trapdoor is equivalent to confidential information corresponding to the public key.

In addition, N∈Z is a security parameter. Moreover, O and ω are Landau symbols. O(NK) in $M^-=O(NK)$ means a function in which $M^-$ is suppressed to NK or lower even in the case of "N→∞." Furthermore, a is a parameter satisfying the following conditional expression.

$$1/\alpha > \sigma \cdot \omega(\sqrt{(\log N)}) \quad \text{[MATH. 3]}$$

First, a generation process of the matrix A, which is to be a public key, is described. The public key is configured as described below as a matrix having respective components as $Z_q$.

[MATH. 4]

$$A = (\bar{A} | \bar{A}T + HG) \quad \text{Equation (3)}$$

As described in equation (3), a notation (E|F) for matrices E and F means that the matrices E and F are arranged side by side. In addition, $\bar{A}$ in the equation (3) is a matrix that is uniformly sampled from $Z_q^{N \times M^-}$. Specifically, $\bar{A}$ is a matrix with N rows and $M^-$ columns having $Z_q$ components.

H in the equation (3) represents a regular matrix of $Z_q^{N \times N}$. In other words, H is a regular matrix with N rows and N columns having $Z_q$ components.

Moreover, $T \in Z^{M^- \times NK}$ of the equation (3) is a matrix in which each column vector is generated from a discrete Gaussian distribution on $Z^{M^-}$ having a variance value of σ, which is described below, and is a matrix referred to as "trapdoor." A function determined according to a real number $\sigma \in R$ (R is a symbol representing a set of the whole real numbers) will be defined as described below.

[MATH. 5]

$$\phi(x) := \frac{1}{\sigma}\exp\left(-\frac{\pi}{\sigma^2}|x|^2\right)$$

Particularly, $\varphi(x)$ satisfying $\sigma=1$ is denoted by $\rho(x)$. The discrete Gaussian distribution on $Z^N$ having a variance value of $\sigma$ is a distribution wherein an integer value $u \in Z^N$ is output with a probability $\varphi(u)/\Sigma_{j=-\infty}^{\infty} \varphi(j)$. Hereinafter, a discrete Gaussian distribution on $Z^N$ having a variance value of a is denoted by $D_{Z^N,\sigma}$. In the key generation process, the matrix A to be a public key and the matrix T to be a trapdoor are output.

In the function computation process, a parameter "param" is input and an arbitrary $\vec{v} \in Z_q^N$ is output.

The inverse-image sampling process includes procedures described below. Incidentally, the regular matrix H described in the generation process of the matrix A to be a public key does not have an influence in the subsequent processes even if the regular matrix H is considered to be an identity matrix. In the subsequent processes, the regular matrix H is considered to be an identify matrix for simplicity.

Symbols and definitions used in the inverse-image sampling process are described below. With respect to a matrix B having a linearly independent column vector, $B^+$ is assumed to be a matrix satisfying an equation "$(BB^+)B=B$." Furthermore, for a matrix $B \in R^{n \times m}$, span(B) is assumed to be $\{B\vec{x} : \vec{x} \in R^m\}$. Moreover, $\Sigma$ is determined to be equal to $BB^t$ ($\Sigma = BB^t$) and "$B = \Sigma^{1/2}$" is described for $\in$. Furthermore, a distorted Gaussian function $\rho_B(\vec{x}):R^n \to (0,1]$ is defined as follows.

[MATH. 6]

$$\rho_B(\vec{x}) = \begin{cases} \rho(B^+\vec{x}) & (\vec{x} \in \text{span}(B)) \\ 0 & (\text{Others}) \end{cases} \quad \text{Equation (4)}$$

Moreover, a probability distribution on $\Lambda + \vec{c}$ is defined as follows.

[MATH. 7]

$$D_{\Lambda+\vec{c},B}(\vec{x}) = \frac{\rho_B(\vec{x})}{\rho_B(\Lambda+\vec{c})} \quad \text{Equation (5)}$$

A distribution following the equation (5) is defined as a distorted Gaussian distribution. Hereinafter, the content of the inverse-image sampling process is described. In the inverse-image sampling process, the following precomputation process is performed, first.

[MATH. 8]

$$\Sigma \leftarrow s \cdot I - \binom{T}{I} \Sigma_G (T \mid I) \quad \text{Equation (6)}$$

Incidentally, I in equation (6) is an identity matrix. After the precomputation process, steps described below are performed. With reference to FIG. 7, the steps will be described. FIG. 7 is an explanatory diagram showing an example of the inverse-image sampling process.

Inputs are assumed to be $\vec{v}$, a public key A, $s \in R$, $r \in R$, $\Sigma_G = 2$ or $5^{1/2}$. $\vec{v}$ is a vector output in the function computation process. Moreover, s is an arbitrary parameter. Furthermore, r is equal to $\omega((\log N)^{1/2})$ ($r = \omega((\log N)^{1/2})$).

Inverse-Image Sampling STEP 1

A perturbation vector $\vec{p} \leftarrow D_{Z^m,r\Sigma}$ is adopted. $\vec{p}$ shown in FIG. 7 is a perturbation vector.

Inverse-Image Sampling STEP 2

A vector $\vec{u} \leftarrow \vec{v} - A\vec{p}$ is computed. There are $A\vec{p}$ and $\vec{u}$ in FIG. 7. Moreover, $\vec{v}$ is a given vector.

Inverse-Image Sampling STEP 3

A vector $\vec{z} \leftarrow D_{\Lambda_{\vec{u}}^{\perp}(G), r\Sigma_G}$ is computed. Specifically, the vector $\vec{z}$ is equivalent to an output including random numbers following a discrete Gaussian distribution on a lattice $\Lambda_{\vec{u}}^{\perp}(G)$, which has a variance value of $r\Sigma_G$. The definition of the lattice is as follows.

$$A_{\vec{u}}^{\perp}(G) := \{\vec{z} : G\vec{z} = \vec{u} \in Z_q^n\} \quad \text{[MATH. 9]}$$

Inverse-Image Sampling STEP 4

The following vector is computed. The computed vector is a short vector that is transformed to $\vec{u}$ when A shown in FIG. 7 is applied.

[MATH. 10]

$$\binom{T}{I}\vec{z}$$

Inverse-Image Sampling STEP 5

The following vector is computed. The computed vector is an "output" vector shown in FIG. 7.

[MATH. 11]

$$\vec{p} + \binom{T}{I}\vec{z}$$

The execution of the above steps, the inverse-image sampling STEP 1 to the inverse-image sampling STEP 5, completes the inverse-image sampling process. Hereinafter, the inverse-image sampling STEP 3 is described in detail from among the inverse-image sampling STEP 1 to the inverse-image sampling STEP 5.

In the inverse-image sampling STEP 3, random numbers following a discrete Gaussian distribution with the center on a lattice described below as the origin are generated, where $\vec{u} = (u_1, \ldots, u_n)$.

[MATH. 12]

$$\underbrace{(u_1, 0, \ldots, 0)^t}_{K \text{ pieces}} + \Lambda(S) \oplus \underbrace{(u_2, 0, \ldots, 0)^t}_{K \text{ pieces}} + $$

$$\Lambda(S) \oplus \ldots \oplus \underbrace{(u_n, 0, \ldots, 0)^t}_{K \text{ pieces}} + \Lambda(S)$$

In the inverse-image sampling STEP 3, a set of random numbers $(x_0^1, \ldots, x_{K-1}^1)$ following a discrete Gaussian distribution with the center on $(u_1, 0, \ldots, 0)^t + \Lambda(S)$ as the origin, a set of random numbers $(x_0^2, \ldots, X_{K-1}^2)$ following a discrete Gaussian distribution with the center on $(u_2, 0, \ldots, 0)^t + \Lambda(S)$ as the origin, ..., and a set of random numbers $(x_0'', \ldots, x_{K-1}'')$ following a discrete Gaussian distribution with the center on $(u_n, 0, \ldots, 0)^t + \Lambda(S)$ as the origin are generated in parallel to each other. The number of elements of each of $(u_1, 0, \ldots, 0)^t$, $(u_2, 0, \ldots, 0)^t$, and $(u_n, 0, \ldots, 0)^t$ is K.

Moreover, in the inverse-image sampling STEP 3, $(x_0^1, \ldots, x_{K-1}^1, x_0^2, \ldots, x_{K-1}^2, \ldots, x_0'', \ldots, x_{K-1}'')$ is generated as an output. Incidentally, S is a basis matrix of a dual primitive lattice.

As a method of computing the random numbers following the discrete Gaussian distribution with the center on $(u, 0, \ldots, 0)^t + \Lambda(S)$ as the origin, there is used the method described in NPL 2, for example. FIG. 8 shows a generation algorithm of the random numbers following a discrete Gaussian distribution with the center on $(u, 0, \ldots, 0)^t + \Lambda(S)$ as the origin in the case of using the method described in NPL 2.

FIG. 8 is an explanatory diagram showing an example of the generation algorithm of random numbers following the discrete Gaussian distribution with the center as the origin. Incidentally, the number of elements of $(u, 0, \ldots, 0)^t$ is K. The inverse-image sampling process is performed as described above.

Citation List

Non Patent Literature

NPL 1: Daniele Micciancio, Chris Peikert, "Trapdoors for Lattices: Simpler, Tighter, Faster, Smaller," EUROCRYPTO 2012, pp. 700-718.

NPL 2: C. Gentry, Peikert, and Vaikuntanathan, "How to use a short basis trapdoors for hard lattices and cryptographic constructions," National Science Foundation 2008, pp. 1-41.

SUMMARY OF INVENTION

Technical Problem

Although the above has described a method of generating random numbers following a discrete Gaussian distribution with the center as the origin, the inverse-image sampling STEP 3 of the inverse-image sampling process described in NPL 1 also requires sequential generation of random numbers following each of discrete Gaussian distributions having different centers.

The reason for that is because the center of the discrete Gaussian distribution followed by random numbers generated in the next process in a loop is determined on the basis of random numbers generated in the current process in the loop. In the case where random numbers following each of discrete Gaussian distributions having different centers are sequentially generated, the random numbers are not generated in parallel and therefore the inverse-image sampling process is not performed at high speed problematically.

Object of the Invention

Therefore, an object of the present invention is to provide an inverse-image sampling device, an inverse-image sampling method, and an inverse-image sampling program capable of sampling arbitrary values, in parallel, as random numbers following discrete Gaussian distributions having different centers to solve the above problem.

Solution to Problem

According to the present invention, there is provided an inverse-image sampling device including: a grouping means that extracts basis vectors from a set of basis vectors for a lattice having a predetermined relationship with a matrix used to generate a public key, and that groups the basis vectors such that a predetermined condition is satisfied; and a sampling means that samples, for at least one group, the same number of arbitrary values as the number of a plurality of basis vectors included in that group, in parallel for the individual basis vectors, onto a lattice constituted by the plurality of basis vectors, the arbitrary values serving as random numbers following a discrete Gaussian distribution, wherein the predetermined condition is that each of the basis vectors included in a group is orthogonal to the other basis vectors included in the same group and is also orthogonal to Gram-Schmidt basis vectors, which are vectors obtained by orthogonalizing the other basis vectors by Gram-Schmidt orthogonalization.

According to the present invention, there is provided an inverse-image sampling method including the steps of: extracting basis vectors from a set of basis vectors for a lattice having a predetermined relationship with a matrix used to generate a public key, and grouping the basis vectors such that a predetermined condition is satisfied; and sampling, for at least one group, the same number of arbitrary values as the number of a plurality of basis vectors included in that group, in parallel for the individual basis vectors, onto a lattice constituted by the plurality of basis vectors, the arbitrary values serving as random numbers following a discrete Gaussian distribution, wherein the predetermined condition is that each of the basis vectors included in a group is orthogonal to the other basis vectors included in the same group and is also orthogonal to Gram-Schmidt basis vectors, which are vectors obtained by orthogonalizing the other basis vectors by Gram-Schmidt orthogonalization.

According to the present invention, there is provided an inverse-image sampling program for causing a computer to perform: a grouping process of extracting basis vectors from a set of basis vectors for a lattice having a predetermined relationship with a matrix used to generate a public key, and of grouping the basis vectors such that a predetermined condition is satisfied; and a sampling process of sampling, for at least one group, the same number of arbitrary values as the number of a plurality of basis vectors included in that group, in parallel for the individual basis vectors, onto a lattice constituted by the plurality of basis vectors, the arbitrary values serving as random numbers following a discrete Gaussian distribution, wherein the predetermined condition is that each of the basis vectors included in a group is orthogonal to the other basis vectors included in the same group and is also orthogonal to Gram-Schmidt basis vectors, which are vectors obtained by orthogonalizing the other basis vectors by Gram-Schmidt orthogonalization.

Advantageous Effects of Invention

The present invention enables sampling of arbitrary values, in parallel, as random numbers following discrete Gaussian distributions having different centers.

BRIEF DESCRIPTION OF DRAWINGS

FIG. 1 is an explanatory diagram showing an example of a generation algorithm of random numbers following a discrete Gaussian distribution.

FIG. 2 is a block diagram showing a configuration example of a first exemplary embodiment of a parallel inverse-image sampling device according to the present invention.

FIG. 8 is an explanatory diagram showing an example of a generation algorithm of random numbers following a discrete Gaussian distribution with the center as the origin.

DESCRIPTION OF EMBODIMENT

Exemplary Embodiment 1

Figure 3:
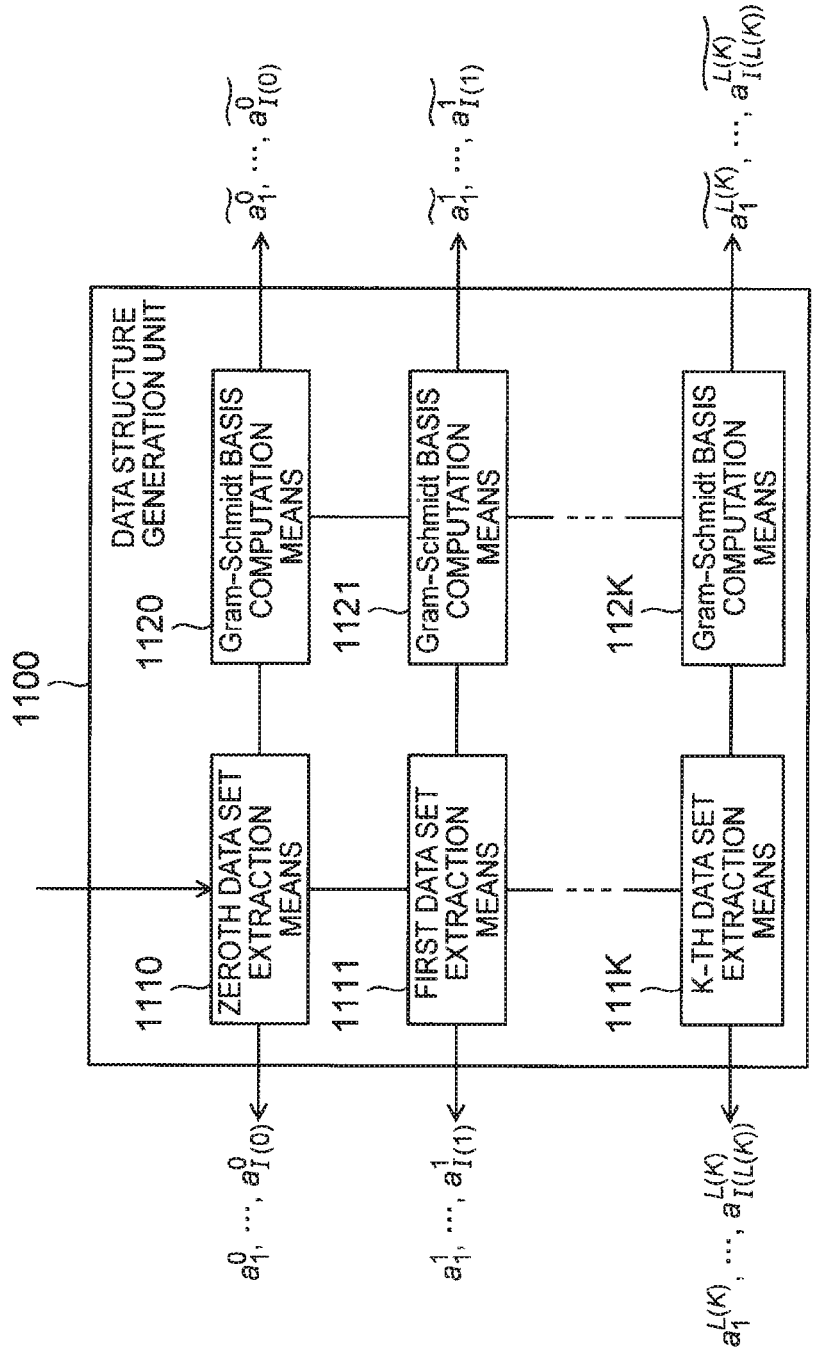
FIG. 3 is a block diagram showing a configuration example of a data structure generation unit 1100 of a first exemplary embodiment.

Hereinafter, an exemplary embodiment of the present invention will be described with reference to appended drawings. Incidentally, a computing operation is performed by $Z_q=Z/qZ$ also in this exemplary embodiment.

First, the configuration of the sampling process on a dual primitive lattice of this exemplary embodiment will be simply described. First, description is made on a method of generating random numbers following a discrete Gaussian distribution on a lattice $\Lambda(B)$ having a general form, which is not limited to a dual primitive lattice, having $\vec{c}$ as the center. Note that, however, $B=(\vec{b_1}, \ldots, \vec{b_n})$ is satisfied.

FIG. 1 is an explanatory diagram showing an example of a generation algorithm of random numbers following a discrete Gaussian distribution. The algorithm shown in FIG. 1 corresponds to an algorithm shown in FIG. 8.

In the loop of the fourth to ninth lines of the algorithm shown in FIG. 1, $z_i$ is generated in a single process and $c_{i-1}$ is updated on the basis of the generated $z_i$. Furthermore, in the next process, the discrete Gaussian distribution is updated on the basis of the updated $c_{i-1}$ and then $z_{i-1}$ is generated. In other words, random numbers $z_n, \ldots, z_1$ are sequentially generated.

When a matrix basis $\vec{b_i}$ is orthogonal to a Gram-Schmidt basis of each of the matrix bases $\vec{b_{i+1}}, \ldots, \vec{b_{i+j}}$ in the algorithm shown in FIG. 1, the processes of (i+j) to (i+1) and the process of i in the processes of (i+j) to i in the loop of the fourth to ninth lines in the algorithm shown in FIG. 1 are able to be computed in parallel.

Specifically, a process of sampling with a sequential loop of (i+j) to i is equal to a process of computing a sampling result with a sequential loop of (i+j) to (i+1) and a sampling result of i in parallel and outputting a sum of the sampling results.

In this exemplary embodiment, the data structure of the basis matrix S of the dual primitive lattice is divided so that the above characteristics are utilized. The basis vectors constituting the basis matrix S is divided into groups so that a predetermined condition is satisfied.

The predetermined condition is that each of the basis vectors included in the group is orthogonal to the other basis vectors included in the same group and is also orthogonal to Gram-Schmidt basis vectors, which are vectors obtained by orthogonalizing the other basis vectors by Gram-Schmidt orthogonalization.

For example, the basis matrix $S=(\vec{a_1}, \ldots, \vec{a_K})$ of the dual primitive lattice are divided into the Levels (groups) as described below.

Basis vector set of Level $0=\{\vec{a_i}: i=2^0 *(\text{odd number})\}$,
Basis vector set of Level $1=\{\vec{a_i}: i=2^1 *(\text{odd number})\}$,
Basis vector set of Level $2=\{\vec{a_i}: i=2^2 *(\text{odd number})\}, \ldots$ In addition, the basis belonging to each Level satisfies a condition of being orthogonal to all Gram-Schmidt bases of other bases in the same Level. The method of dividing the basis vectors constituting the basis matrix S is not limited to the above method.

For example, in the case where the basis vector set of a predetermined Level is $\{\vec{b_1}, \vec{b_2}, \vec{b_3}\}$, the following relationship is established between the basis vectors.

[MATH. 13]

$$\vec{b}_1 \perp \{\tilde{b}_2, \tilde{b}_3\} \; \vec{b}_2 \perp \{\tilde{b}_1, \tilde{b}_3\} \; \vec{b}_3 \perp \{\tilde{b}_2, \tilde{b}_1\} \qquad \text{Equation (7)}$$

In other words, the parallel computation of the sampling process is able to be performed in the same Level. Incidentally, the sampling process for a basis set that does not satisfy the above condition is performed in a sequential manner.

Therefore, the algorithm of this exemplary embodiment is as described below, the algorithm instead serving as the process of fourth to ninth lines in the algorithm shown in FIG. 1.

Proposed Algorithm STEP 0

First, as a precomputation process, a Level division of basis vectors constituting the basis matrix of the dual primitive lattice is performed such that the predetermined condition is satisfied.

$$\text{Level } j = \{a_1^j, \ldots, a_{I(j)}^j\} (0 \le j \le L(K))$$

Proposed Algorithm STEP 1

Subsequently, the following computation is performed from j=0 corresponding to the lowest Level to j=L(K) corresponding to the highest Level. Note that K indicates the dimension of S.

[MATH. 14]

$$\vec{c} \leftarrow \vec{c} - \sum_{i=1}^{I(j)} \left( \alpha_i \leftarrow D_{z, \frac{\langle \vec{c}, \vec{a}_i^J \rangle}{\|\vec{a}_i^J\|^2}} \right) \vec{a}_i^J \qquad \text{Equation (8)}$$

The last vector $(0, \ldots, 0, 2)^t$ is included in the Level L(K), which is the highest Level.

Description will be made on a concrete example of enabling a parallel computation in the same Level, by using a basis vector set of the aforementioned predetermined Level. Specifically, description will be made on an example of a sampling process for a case of i+j=3 and i+1=1.

In the sampling process following the algorithm shown in FIG. 1, the following vectors are sequentially computed for $\vec{c}$ used as the center of an input discrete Gaussian distribution.

[MATH. 15]

$$\vec{c}_2 \leftarrow \vec{c} - \left( \alpha_1 \leftarrow D_{z, \frac{\langle \vec{c}, \vec{b}_3 \rangle}{\|\vec{b}_3\|^2}} \right) \vec{b}_3$$

$$\vec{c}_1 \leftarrow \vec{c}_2 - \left( \alpha_2 \leftarrow D_{z, \frac{\langle \vec{c}_2, \vec{b}_2 \rangle}{\|\vec{b}_2\|^2}} \right) \vec{b}_2$$

$$\vec{d} \leftarrow \vec{c}_1 - \left( \alpha_3 \leftarrow D_{z, \frac{\langle \vec{c}_1, \vec{b}_1 \rangle}{\|\vec{b}_1\|^2}} \right) \vec{b}_1$$

Coefficients $\alpha_1$ to coefficient $\alpha_3$ correspond to random numbers. Furthermore, the vector ($\vec{d} - \vec{c}$) corresponds to a vector $\vec{z}$ computed in the inverse-image sampling STEP 3. Since the equation (7) is satisfied in this example, the following relationship is established, for example.

$$\langle \vec{c}_2, \vec{\tilde{b}}_2 \rangle = \langle (\vec{c} - \alpha_1 \vec{b}_3), \vec{\tilde{b}}_2 \rangle = \langle \vec{c}, \vec{\tilde{b}}_2 \rangle - \alpha_1 \langle \vec{b}_3, \vec{\tilde{b}}_2 \rangle = \langle \vec{c}, \vec{\tilde{b}}_2 \rangle \quad [\text{MATH. 16}]$$

In other words, even if $\vec{c}_2$ is not given, a coefficient $\alpha_2$, which is a random number following the discrete Gaussian distribution, is computed. Similarly, the following relationship is established.

[MATH. 17]

$$\langle \vec{c}_1, \vec{\tilde{b}}_1 \rangle = \langle (\vec{c}_2 - \alpha_2 \vec{b}_2), \vec{\tilde{b}}_1 \rangle = \langle \vec{c}_2, \vec{\tilde{b}}_1 \rangle - \alpha_2 \langle \vec{b}_2, \vec{\tilde{b}}_1 \rangle =$$
$$\langle (\vec{c} - \alpha_1 \vec{b}_3), \vec{\tilde{b}}_1 \rangle = \langle \vec{c}, \vec{\tilde{b}}_1 \rangle - \alpha_1 \langle \vec{b}_3, \vec{\tilde{b}}_1 \rangle = \langle \vec{c}, \vec{\tilde{b}}_1 \rangle$$

In other words, even if $\vec{c}_2$ and $\vec{c}_1$ are not given, a coefficient $\alpha_3$, which is a random number following the discrete Gaussian distribution, is computed. Therefore, the coefficients $\alpha_1$ to $\alpha_3$ are computed in parallel, by which a vector $\vec{d}$ is computed at high speed.

[Description of Configuration]

FIG. 2 is a block diagram showing a configuration example of a first exemplary embodiment of a parallel inverse-image sampling device according to the present invention. As shown in FIG. 2, a parallel inverse-image sampling device 1000 of this exemplary embodiment includes a data structure generation unit 1100, a Level parallel computation unit 1200, and an output unit 1300.

The data structure generation unit 1100 has a function of generating a data structure optimum for a basis matrix of a dual primitive lattice. FIG. 3 is a block diagram showing a configuration example of the data structure generation unit 1100 of the first exemplary embodiment.

As shown in FIG. 3, the data structure generation unit 1100 of this exemplary embodiment includes a zeroth data set extraction means 1110 to a K-th data set extraction means 111K, and a Gram-Schmidt basis computation means 1120 to a Gram-Schmidt basis computation means 112K.

The configuration example of the data structure generation unit 1100 shown in FIG. 3 is a configuration example of a data structure generation unit that generates a data structure optimum for the basis matrix of the dual primitive lattice. The configuration example shown in FIG. 3 is a configuration example adopted in the case where a dividing method into respective Levels is previously determined since the basis matrix of the dual primitive lattice is previously determined.

In other words, a user is able to previously give a dividing method into respective Levels to the parallel inverse-image sampling device 1000. In the case where the dividing method into respective Levels is previously given, each data set extraction means extracts a data set according to the given dividing method into the respective Levels.

Each data set extraction means has a function of extracting a data set of each Level. For example, the zeroth data set extraction means 1110 extracts a data set of Level 0, $\{a_1^0, \ldots, a_{I(0)}^0\}$.

Moreover, each Gram-Schmidt basis computation means has a function of computing a Gram-Schmidt basis for a data set of each Level. For example, the Gram-Schmidt basis computation means 1120 computes a Gram-Schmidt basis for a data set of Level 0, $\{\tilde{a}_1^0, \ldots, \tilde{a}_{I(0)}^0\}$.

Figure 4:
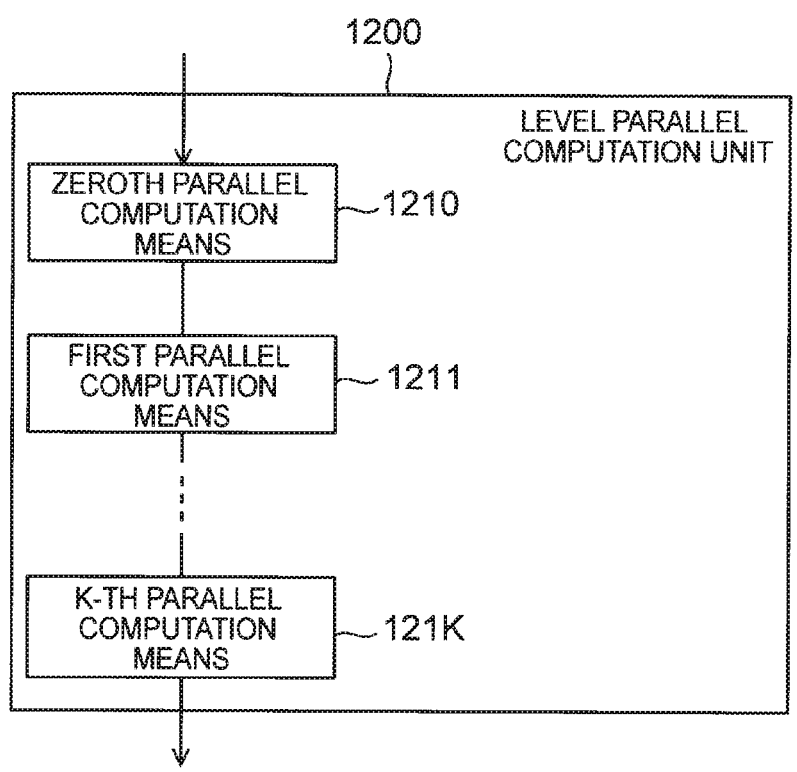
FIG. 4 is a block diagram showing a configuration example of a Level parallel computation unit 1200 of the first exemplary embodiment.

The Level parallel computation unit 1200 has a function of computing random numbers following a discrete Gaussian distribution for each Level in parallel. FIG. 4 is a block diagram showing a configuration example of a Level parallel computation unit 1200 of the first exemplary embodiment.

As shown in FIG. 4, the Level parallel computation unit 1200 of this exemplary embodiment includes a zeroth parallel computation means 1210 to a K-th parallel computation means 121K. Each parallel computation means has a function of computing random numbers following a discrete Gaussian distribution of each Level in parallel. For example, the zeroth parallel computation means 1210 computes random numbers following the discrete Gaussian distribution at Level 0 in parallel.

The output unit 1300 has a function of outputting random numbers or the like computed by the Level parallel computation unit 1200.

[Description of Operation]

Figure 5:
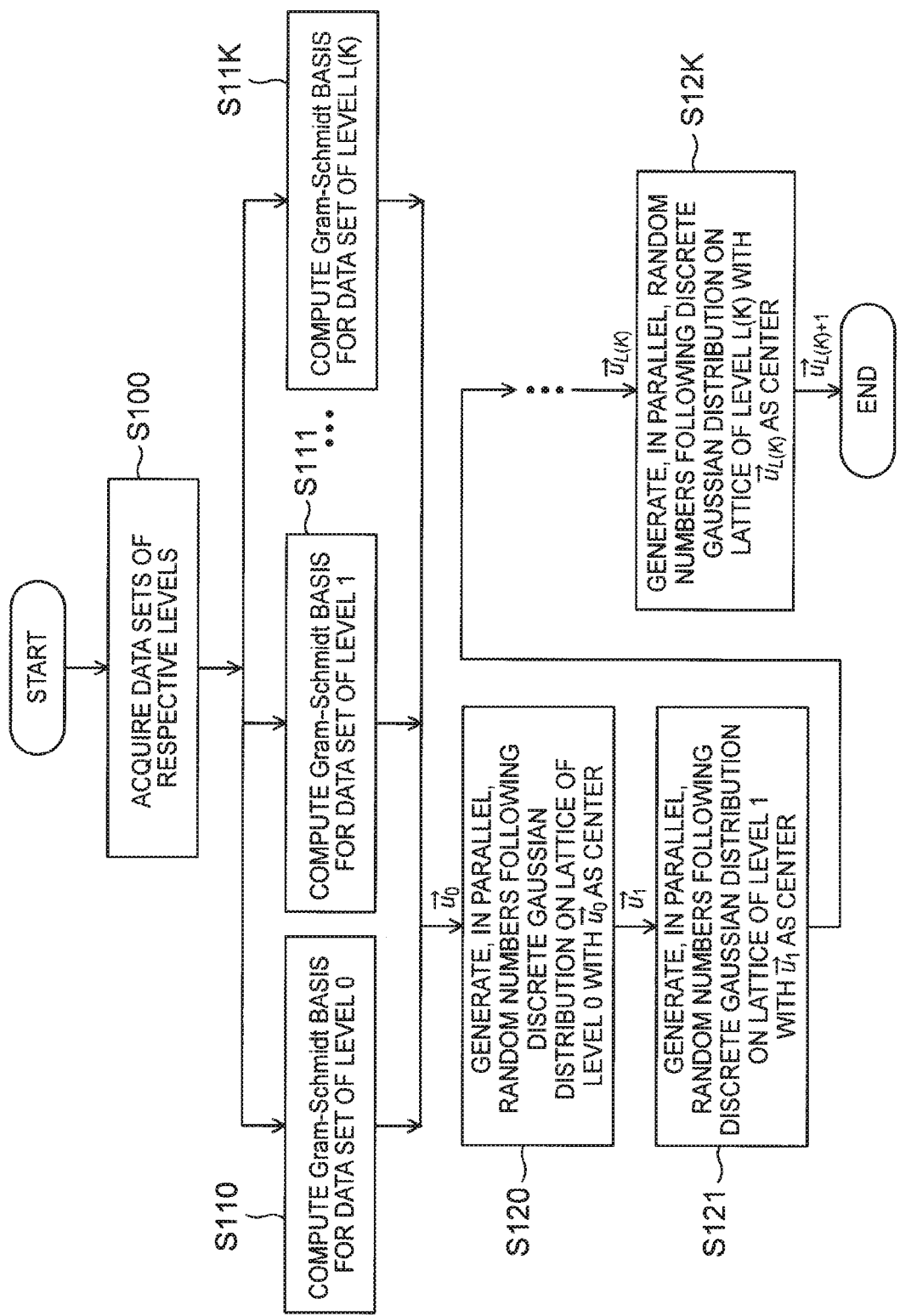
FIG. 5 is a flowchart showing an operation of a sampling process performed by the parallel inverse-image sampling device 1000 of the first exemplary embodiment.

Hereinafter, description will be made on an operation in which the parallel inverse-image sampling device 1000 of this exemplary embodiment samples random numbers as arbitrary values on a dual primitive lattice, with reference to FIG. 5. FIG. 5 is a flowchart showing the operation of a sampling process performed by the parallel inverse-image sampling device 1000 of the first exemplary embodiment.

In this example, symbols are defined as follows with $N \in Z$ as a security parameter.

[MATH. 18]

$$K \in N, q = 2^K, \sigma = \omega(\sqrt{\log N}) \qquad \text{Equation (9)}$$

First, the data structure generation unit 1100 receives input data. Subsequently, the zeroth data set extraction means 1110 to the K-th data set extraction means 111K acquire data sets of respective Levels according to, for example, a given dividing method into respective Levels (step S100). The process of step S100 corresponds to a process of grouping in such a way that a predetermined condition is satisfied.

Subsequently, the zeroth data set extraction means 1110 inputs the extracted data set of Level 0 into the Gram-Schmidt basis computation means 1120. The Gram-Schmidt basis computation means 1120 then computes a Gram-Schmidt basis for the data set of Level 0 (step S110).

Subsequently, the Gram-Schmidt basis computation means 1120 inputs the computed Gram-Schmidt basis into other all Gram-Schmidt basis computation means and the zeroth parallel computation means 1210.

Similarly, the first data set extraction means 1111 inputs an extracted data set of Level 1 into the Gram-Schmidt basis computation means 1121. The Gram-Schmidt basis computation means 1121 then computes the Gram-Schmidt basis for the data set of Level 1 (step S111).

Subsequently, the Gram-Schmidt basis computation means 1121 inputs the computed Gram-Schmidt basis into other all Gram-Schmidt basis computation means and a first parallel computation means 1211.

Similarly, the K-th data set extraction means 111K inputs the extracted data set of Level L(K) into the Gram-Schmidt basis computation means 112K. The Gram-Schmidt basis computation means 112K then computes the Gram-Schmidt basis for the data set of Level L(K) (step S11K).

Subsequently, the Gram-Schmidt basis computation means 112K inputs the computed Gram-Schmidt basis into other all Gram-Schmidt basis computation means and the K-th parallel computation means 121K. The processes of the above steps S100 to S11K constitute the precomputation process.

Subsequently, the parallel inverse-image sampling device 1000 generates random numbers following the discrete Gaussian distribution on the dual primitive lattice. First, the zeroth parallel computation means 1210 receives $u_0^{\rightarrow}$ from the input means (not shown). Incidentally, $u_0^{\rightarrow}$ corresponds to $c^{\rightarrow}$ in the algorithm shown in FIG. 1.

Subsequently, the zeroth parallel computation means 1210 generates, in parallel, random numbers following a discrete Gaussian distribution with $u_0^{\rightarrow}$ on the lattice of Level 0 as the center (step S120). After generating the random numbers, the zeroth parallel computation means 1210 inputs an output value $u_1^{\rightarrow}$ into the first parallel computation means 1211.

Subsequently, the first parallel computation means 1211 receives $u_1^{\rightarrow}$ from the zeroth parallel computation means 1210. The first parallel computation means 1211 generates, in parallel, random numbers following a discrete Gaussian distribution with $u_1^{\rightarrow}$ on the lattice of Level 1 as the center (step S121). The first parallel computation means 1211 inputs an output value $u_2^{\rightarrow}$ into a second parallel computation means 1212.

Hereinafter, the respective parallel computation means sequentially perform the processes corresponding to the process of step S120. Finally, the K-th parallel computation means 121K receives $u_{L(K)}^{\rightarrow}$ from a (K−1)th parallel computation means 121(K−1). The K-th parallel computation means 121K generates, in parallel, random numbers following a discrete Gaussian distribution with $u_{L(K)}^{\rightarrow}$ on the lattice of Level L(K) as the center (step S12K).

Unless the basis vector of Level L(K) satisfies the condition of being orthogonal to other all Gram-Schmidt bases in the same Level, the K-th parallel computation means 121K sequentially generates random numbers following the discrete Gaussian distribution.

The K-th parallel computation means 121K inputs $u_{L(K)+1}^{\rightarrow}$ into the output unit 1300. After the output unit 1300 outputs $u_{L(K)+1}^{\rightarrow}$, the parallel inverse-image sampling device 1000 ends the sampling process.

Incidentally, a device (not shown) other than the parallel inverse-image sampling device 1000 subtracts $u_0^{\rightarrow}$ from the output $u_{L(K)+1}^{\rightarrow}$ to find a linear sum of random numbers and bases. The process of finding the linear sum of random numbers and bases corresponds to a process of computing a vector $z^{\rightarrow}$ in the inverse-image sampling STEP 3. Moreover, the parallel inverse-image sampling device 1000 may find the linear sum of random numbers and bases.

Description of Advantageous Effects

The object of the present invention is to increase the speed of the sampling process by optimizing the data structure of the basis matrix S of the dual primitive lattice so as to enable the execution of a parallel computation.

An inverse-image sampling process of a trapdoor one-way function requires generation of random numbers following a discrete Gaussian distribution on a predetermined lattice, which is referred to as "dual primitive lattice." In this exemplary embodiment, an algorithm for optimizing the data structure of the basis matrix of the dual primitive lattice is introduced into a process of generating random numbers.

With the introduction of the algorithm for optimizing the data structure, an algorithm for generating random numbers on the dual primitive lattice described in NPL 1 is partially rewritten to an algorithm enabling the execution of a parallel computation. In other words, a high-speed inverse-image sampling process is implemented.

The following describes a reason for the implementation of the high-speed inverse-image sampling process. In a general method of outputting random numbers following the discrete Gaussian distribution on the dual primitive lattice, there is used an algorithm for generating random numbers following a discrete Gaussian distribution on a general lattice, which is not limited to the dual primitive lattice.

In the algorithm for generating random numbers following the discrete Gaussian distribution on the general lattice, the random numbers are output after sequentially performing procedures for a discrete Gaussian distribution on integers for each basis vector on the lattice as an output target.

If there is a predetermined type of orthogonality relation between basis vectors, a procedure for the discrete Gaussian distribution is performed in parallel between the basis vectors having the orthogonality relation. In other words, the procedure for the discrete Gaussian distribution need not be sequentially performed.

For utilization of the above characteristics, the parallel inverse-image sampling device 1000 of this exemplary embodiment performs level division of the basis vectors so that the above orthogonality relation is satisfied within the same level, particularly for the basis matrix of the dual primitive lattice.

If the algorithm for generating random numbers following the discrete Gaussian distribution is performed after the execution of the above processes, a parallel computation of random numbers can be performed within the same level, thereby enabling execution of a high-speed inverse-image sampling process. If the level division is performed for Level 0 to Level N, the processing time of the inverse-image sampling process is almost proportional to $\log_2 N$.

The parallel inverse-image sampling device 1000 of this exemplary embodiment may be implemented by, for example, a central processing unit (CPU) that performs processing according to a program stored in a non-transitory storage medium. Specifically, the data structure generation unit 1100, the Level parallel computation unit 1200, and the output unit 1300 may be implemented by the CPU that performs processes according to a program control, for example. Furthermore, the parallel inverse-image sampling device 1000 of this exemplary embodiment may be a data processor.

Furthermore, the respective units of the parallel inverse-image sampling device 1000 of this exemplary embodiment may be implemented by hardware circuits. For example, the data structure generation unit 1100, the Level parallel computation unit 1200, and the output unit 1300 are each implemented by large scale integration (LSI). Alternatively, these units may be implemented by a single LSI.

Figure 6:
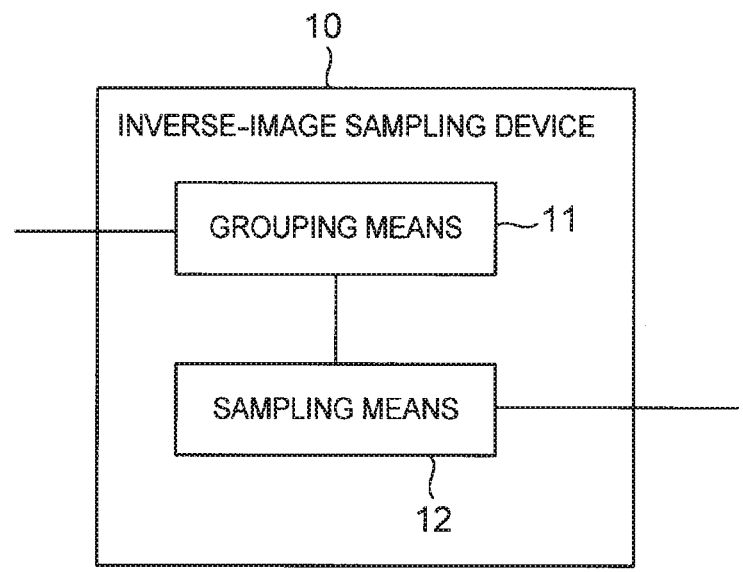
FIG. 6 is a block diagram showing an outline of an inverse-image sampling device according to the present invention.
Figure 7:
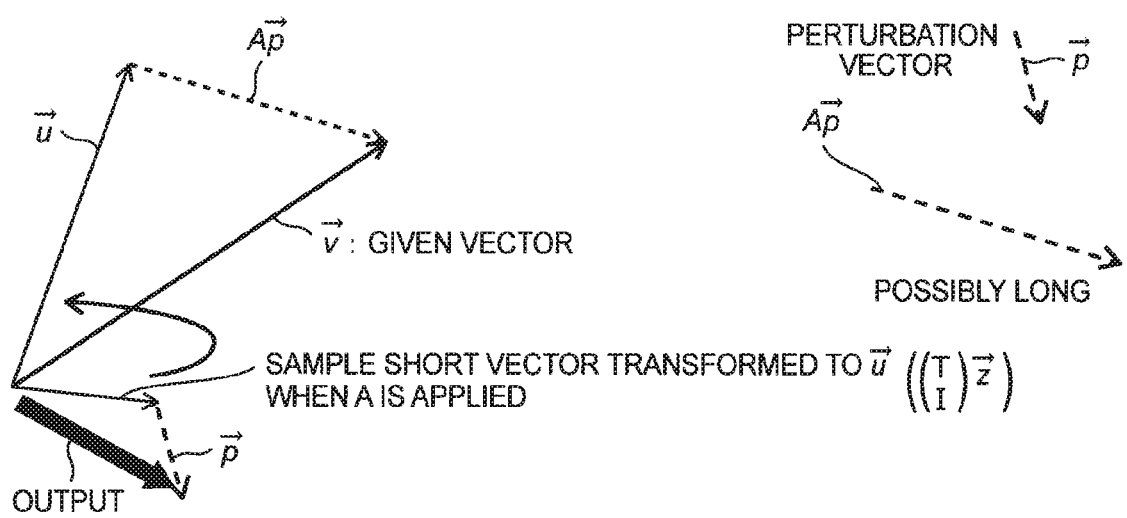
FIG. 7 is an explanatory diagram showing an example of an inverse-image sampling process.

Subsequently, the outline of the present invention will be described. FIG. 6 is a block diagram showing an outline of an inverse-image sampling device according to the present invention. An inverse-image sampling device 10 according to the present invention includes: a grouping means 11 (for example, the data structure generation unit 1100) that extracts basis vectors from a set of basis vectors for a lattice having a predetermined relationship with a matrix used to generate a public key, and that groups the basis vectors such that a predetermined condition is satisfied; and a sampling means 12 (for example, the Level parallel computation unit 1200) that samples, for at least one group, the same number of arbitrary values as the number of a plurality of basis vectors included in that group, in parallel for the individual basis vectors, onto a lattice constituted by the plurality of basis vectors, the arbitrary values serving as random numbers following a discrete Gaussian distribution, and the predetermined condition is that each of the basis vectors included in a group is orthogonal to the other basis vectors included in the same group and is also orthogonal to Gram-Schmidt basis vectors, which are vectors obtained by orthogonalizing the other basis vectors by Gram-Schmidt orthogonalization.

The configuration enables the inverse-image sampling device to sample arbitrary values, in parallel, as random numbers following discrete Gaussian distributions having different centers. The sampled arbitrary values are used to generate an inverse image of a trapdoor one-way function.

Furthermore, the basis vectors for the lattice may be vectors each having a non-zero component of (2, −1).

According to the above configuration, the inverse-image sampling device is able to sample arbitrary values as random numbers following a discrete Gaussian distribution in parallel for each of the bases constituting the basis matrix of a dual primitive lattice.

Moreover, the sampling means 12 may acquire an arbitrary vector and sample arbitrary values as random numbers following a discrete Gaussian distribution with an element of the acquired arbitrary vector as the center and may output a vector composed of the sampled arbitrary values and a plurality of basis vectors included in the group.

The above configuration enables the inverse-image sampling device to generate an inverse image of a trapdoor one-way function.

Furthermore, the inverse-image sampling device 10 may include a plurality of sampling means 12 and the plurality of sampling means may include a sampling means that receives an input of a vector output from another sampling means.

The above configuration enables the inverse-image sampling device to generate the inverse image of the trapdoor one-way function at higher speed.

Furthermore, the inverse-image sampling device 10 may include a generation means that generates a Gram-Schmidt basis vector of the basis vector included in the group (for example, the Gram-Schmidt basis computation means 1120 to the Gram-Schmidt basis computation means 112K), and the sampling means 12 may sample arbitrary values by using the generated Gram-Schmidt basis vector.

The above configuration enables the inverse-image sampling device to sample arbitrary values as random numbers following discrete Gaussian distributions having different centers at higher speed.

Furthermore, the inverse-image sampling device 10 may include the same number of generation means as the number of groups generated by the grouping means 11 with grouping.

The above configuration enables the inverse-image sampling device to sample arbitrary values as random numbers following discrete Gaussian distributions having different centers at higher speed.

Although the present invention has been described with reference to the exemplary embodiments and examples hereinabove, the present invention is not limited thereto. A variety of changes, which can be understood by those skilled in the art, may be made in the configuration and details of the present invention within the scope thereof.

REFERENCE SIGNS LIST

10 Inverse-image sampling device
11 Grouping means
12 Sampling means
1000 Parallel inverse-image sampling device
1100 Data structure generation unit
1110 Zeroth data set extraction means
1111 First data set extraction means
111K K-th data set extraction means
1120 to 112K Gram-Schmidt basis computation means
1200 Level parallel computation unit
1210 Zeroth parallel computation means
1211 First parallel computation means
121K K-th parallel computation means
1300 Output unit

The invention claimed is:

1. An inverse-image sampling device comprising:
a grouping unit, implemented by a hardware including one or more processors, that extracts basis vectors from a set of basis vectors for a lattice having a predetermined relationship with a matrix used to generate a public key, and that groups the basis vectors such that a predetermined condition is satisfied; and
a sampling unit, implemented by the hardware, that samples, for at least one group, the same number of arbitrary values as the number of a plurality of basis vectors included in that group, in parallel for the individual basis vectors, onto a lattice constituted by the plurality of basis vectors, the arbitrary values serving as random numbers following a discrete Gaussian distribution,
wherein the predetermined condition is that each of the basis vectors included in a group is orthogonal to the other basis vectors included in the same group and is also orthogonal to Gram-Schmidt basis vectors, which are vectors obtained by orthogonalizing the other basis vectors by Gram-Schmidt orthogonalization.

2. The inverse-image sampling device according to claim 1, wherein
the basis vectors for the lattice are vectors each having a non-zero component of (2, −1).

3. The inverse-image sampling device according to claim 2, wherein
the sampling unit acquires an arbitrary vector, samples arbitrary values as random numbers following a discrete Gaussian distribution with an element of the acquired arbitrary vector as the center, and outputs a vector composed of the sampled arbitrary values and a plurality of basis vectors included in the group.

4. The inverse-image sampling device according to claim 3, further comprising:
a plurality of sampling unit implemented by the hardware, wherein
the plurality of sampling unit include a sampling unit that receives an input of a vector output from another sampling unit.

5. The inverse-image sampling device according to claim 4, further comprising:
a generation unit, implemented by the hardware, that generates a Gram-Schmidt basis vector of the basis vector included in the group, wherein
the sampling unit samples arbitrary values by using the generated Gram-Schmidt basis vector.

6. The inverse-image sampling device according to claim 3, further comprising:
a generation unit, implemented by the hardware, that generates a Gram-Schmidt basis vector of the basis vector included in the group, wherein
the sampling unit samples arbitrary values by using the generated Gram-Schmidt basis vector.

7. The inverse-image sampling device according to claim 2, further comprising:
   a generation unit, implemented by the hardware, that generates a Gram-Schmidt basis vector of the basis vector included in the group, wherein
   the sampling unit samples arbitrary values by using the generated Gram-Schmidt basis vector.

8. The inverse-image sampling device according to claim 7, further comprising:
   the same number of generation unit, implemented by the hardware, as the number of groups generated by the grouping unit with grouping.

9. The inverse-image sampling device according to claim 1, wherein
   the sampling unit acquires an arbitrary vector, samples arbitrary values as random numbers following a discrete Gaussian distribution with an element of the acquired arbitrary vector as the center, and outputs a vector composed of the sampled arbitrary values and a plurality of basis vectors included in the group.

10. The inverse-image sampling device according to claim 9, further comprising:
    a plurality of sampling unit implemented by the hardware, wherein
    the plurality of sampling unit include a sampling unit that receives an input of a vector output from another sampling unit.

11. The inverse-image sampling device according to claim 10, further comprising:
    a generation unit, implemented by the hardware, that generates a Gram-Schmidt basis vector of the basis vector included in the group, wherein
    the sampling unit samples arbitrary values by using the generated Gram-Schmidt basis vector.

12. The inverse-image sampling device according to claim 11, further comprising:
    the same number of generation unit, implemented by the hardware, as the number of groups generated by the grouping unit with grouping.

13. The inverse-image sampling device according to claim 9, further comprising:
    a generation unit, implemented by the hardware, that generates a Gram-Schmidt basis vector of the basis vector included in the group, wherein
    the sampling unit samples arbitrary values by using the generated Gram-Schmidt basis vector.

14. The inverse-image sampling device according to claim 13, further comprising:
    the same number of generation unit, implemented by the hardware, as the number of groups generated by the grouping unit with grouping.

15. The inverse-image sampling device according to claim 1, further comprising:
    a generation unit, implemented by the hardware, that generates a Gram-Schmidt basis vector of the basis vector included in the group, wherein
    the sampling unit samples arbitrary values by using the generated Gram-Schmidt basis vector.

16. The inverse-image sampling device according to claim 15, further comprising:
    the same number of generation unit, implemented by the hardware, as the number of groups generated by the grouping unit with grouping.

17. A computer-implemented inverse-image sampling method comprising the steps of:
    extracting basis vectors from a set of basis vectors for a lattice having a predetermined relationship with a matrix used to generate a public key, and grouping the basis vectors such that a predetermined condition is satisfied; and
    sampling, for at least one group, the same number of arbitrary values as the number of a plurality of basis vectors included in that group, in parallel for the individual basis vectors, onto a lattice constituted by the plurality of basis vectors, the arbitrary values serving as random numbers following a discrete Gaussian distribution,
    wherein the predetermined condition is that each of the basis vectors included in a group is orthogonal to the other basis vectors included in the same group and is also orthogonal to Gram-Schmidt basis vectors, which are vectors obtained by orthogonalizing the other basis vectors by Gram-Schmidt orthogonalization.

18. The computer-implemented inverse-image sampling method according to claim 17, wherein
    the basis vectors for the lattice are vectors each having a non-zero component of (2, −1).

19. A non-transitory computer-readable capturing medium having captured therein an inverse-image sampling program for causing a computer to perform:
    a grouping process of extracting basis vectors from a set of basis vectors for a lattice having a predetermined relationship with a matrix used to generate a public key, and of grouping the basis vectors such that a predetermined condition is satisfied; and
    a sampling process of sampling, for at least one group, the same number of arbitrary values as the number of a plurality of basis vectors included in that group, in parallel for the individual basis vectors, onto a lattice constituted by the plurality of basis vectors, the arbitrary values serving as random numbers following a discrete Gaussian distribution,
    wherein the predetermined condition is that each of the basis vectors included in a group is orthogonal to the other basis vectors included in the same group and is also orthogonal to Gram-Schmidt basis vectors, which are vectors obtained by orthogonalizing the other basis vectors by Gram-Schmidt orthogonalization.

20. The medium according to claim 19, wherein
    the basis vectors for the lattice are vectors each having a non-zero component of (2, −1).

* * * * *